US012289278B2

(12) United States Patent
Janovsky et al.

(10) Patent No.: US 12,289,278 B2
(45) Date of Patent: *Apr. 29, 2025

(54) DYNAMICALLY DISTRIBUTING MESSAGING RESOURCES IN SOFTWARE AS A SERVICE MESSAGING PLATFORM

(71) Applicant: Twilio Inc., San Francisco, CA (US)

(72) Inventors: Peter Janovsky, Pleasanton, CA (US); Sergio Leottau, Cartagena (CO); Eliot Flannery, Seattle, WA (US); Jaime Soto, Doral, FL (US); Shayra Kamal, New York, NY (US)

(73) Assignee: Twilio Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/531,238

(22) Filed: Dec. 6, 2023

(65) Prior Publication Data

US 2024/0106780 A1  Mar. 28, 2024

Related U.S. Application Data

(63) Continuation of application No. 17/853,406, filed on Jun. 29, 2022, now Pat. No. 11,882,086.

(51) Int. Cl.
*H04L 51/21* (2022.01)
*H04L 47/625* (2022.01)
*H04L 51/226* (2022.01)

(52) U.S. Cl.
CPC .......... *H04L 51/21* (2022.05); *H04L 47/6255* (2013.01); *H04L 47/626* (2013.01); *H04L 51/226* (2022.05)

(58) Field of Classification Search
CPC ....... H04L 51/21; H04L 51/226; H04L 51/48; H04L 51/04; H04L 47/6255; H04L 47/626
See application file for complete search history.

(56) References Cited

U.S. PATENT DOCUMENTS

| | | | |
|---|---|---|---|
| 7,606,154 B1 * | 10/2009 | Lee | H04L 47/30 370/232 |
| 10,313,257 B1 | 6/2019 | Hunt et al. | |
| 10,382,380 B1 * | 8/2019 | Suzani | H04L 47/629 |
| 11,221,883 B2 * | 1/2022 | Bischel | G06F 9/5027 |
| 11,256,655 B2 * | 2/2022 | Johnsen | H04L 47/26 |
| 11,477,322 B1 * | 10/2022 | Ambekar | H04M 3/5232 |
| 11,528,232 B1 | 12/2022 | Zhang et al. | |

(Continued)

*Primary Examiner* — Alina A Boutah
(74) *Attorney, Agent, or Firm* — Lowenstein Sandler LLP

(57) ABSTRACT

An example method of dynamically distributing messaging resources in a software as a service (SaaS) platform includes: receiving, by a processing device, from a first tenant associated with a first tenant set of a plurality of tenant sets, a request to forward a first message to a recipient within a specified destination; identifying, among a plurality of queues associated with the plurality of tenant sets, a subset of queues associated with the first tenant; queuing the first message into a first queue of the subset of queues associated with the first tenant; assigning, to each queue of the plurality of queues, a score reflecting a respective tenant portion of a messaging resource quota associated with the specified destination; retrieving a second message from a queue associated with a highest score; and forwarding the second message to a messaging gateway associated with the specified destination.

20 Claims, 5 Drawing Sheets

(56) References Cited

U.S. PATENT DOCUMENTS

| | | | |
|---|---|---|---|
| 2012/0089681 A1* | 4/2012 | Chowdhury | H04L 67/55 709/206 |
| 2014/0269325 A1* | 9/2014 | Chrysos | H04L 49/506 370/237 |
| 2014/0358620 A1 | 12/2014 | Krebs et al. | |
| 2015/0067069 A1* | 3/2015 | Gourevitch | H04L 51/226 709/206 |
| 2016/0119246 A1 | 4/2016 | Wang | |
| 2016/0134573 A1* | 5/2016 | Gagliardi | H04L 67/10 709/204 |
| 2018/0176981 A1* | 6/2018 | Baer | H04W 48/18 |
| 2018/0278567 A1* | 9/2018 | Archer | H04L 43/16 |
| 2019/0065078 A1* | 2/2019 | Yerfule | G06F 3/0685 |
| 2019/0158415 A1 | 5/2019 | Pan et al. | |
| 2019/0349319 A1 | 11/2019 | Kwong et al. | |
| 2019/0379612 A1 | 12/2019 | Tiwary et al. | |
| 2019/0386930 A1 | 12/2019 | Shrivastava | |
| 2020/0409763 A1 | 12/2020 | Bischel et al. | |
| 2021/0152494 A1 | 5/2021 | Johnsen et al. | |
| 2022/0311727 A1* | 9/2022 | Agarwal | H04L 51/226 |
| 2022/0311728 A1* | 9/2022 | Sivaswamy | G06N 3/084 |
| 2022/0345485 A1* | 10/2022 | Kras | H04L 51/212 |

\* cited by examiner

DYNAMICALLY DISTRIBUTING MESSAGING RESOURCES IN SOFTWARE AS A SERVICE MESSAGING PLATFORM

REFERENCE TO RELATED APPLICATION

This application is a continuation of U.S. patent application Ser. No. 17/853,406 filed on Jun. 29, 2022, which is incorporated by reference herein.

TECHNICAL FIELD

Aspects and implementations of the disclosure relate to computer networking, and more specifically, to systems and methods for dynamically distributing messaging resources in a software as a service (SaaS) platform.

BACKGROUND

Instant messaging (IM) technology may include a type of online chat allowing real-time transmission of media content over the Internet or another computer network. Messages are typically transmitted between two or more parties, when each user inputs content and triggers a transmission to the recipient(s), who may be all connected on a common network or common application. Short Messaging Service (SMS) technology may include text messaging. An SMS message is often sent from one mobile device to another over the cellular network. Multimedia Messaging Service (MMS) technology may include a way to send messages that include multimedia content to and from a device, such as a mobile phone, over a cellular network.

BRIEF DESCRIPTION OF THE DRAWINGS

Aspects and implementations of the disclosure will be understood more fully from the detailed description given below and from the accompanying drawings of various aspects and implementations of the disclosure, which, however, should not be taken to limit the disclosure to the specific aspects or implementations, but are for explanation and understanding.

DETAILED DESCRIPTION

Figure 1:
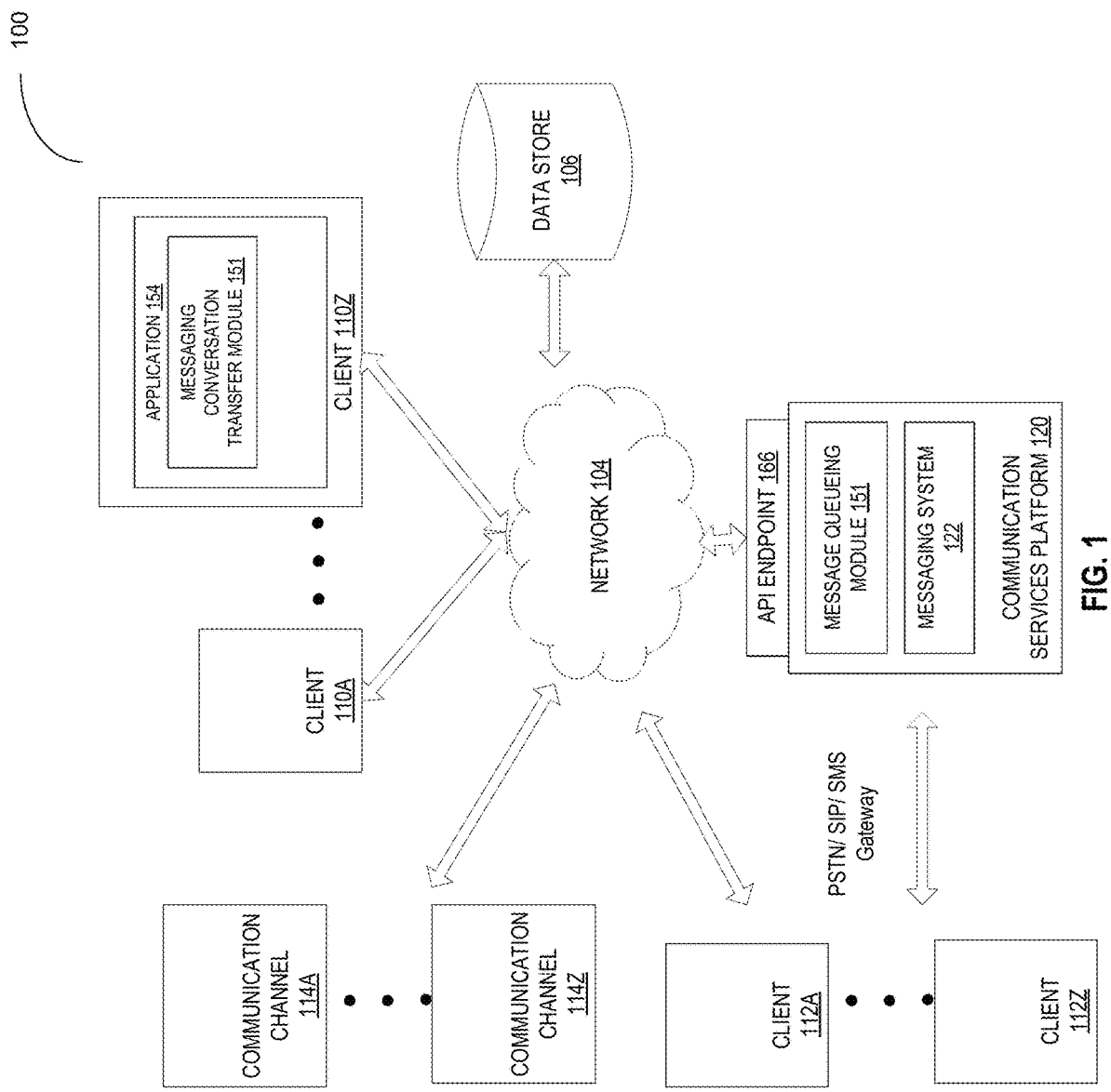
FIG. 1 illustrates an example system architecture of a communication services platform, in accordance with some implementations of the disclosure.

Various organizations have increasingly adopted messaging as a valuable tool for communications within and outside of the organization. In an example use case, an organization may use messaging to forward to end users one-time passwords for a two-factor authentication scheme. In another example use case, an organization may use messaging to send promotional messages to its customers. In another example use case, an organization may use messaging to send appointment reminders to its customers and may further request the message receiver to reply to either confirm or cancel an appointment.

In various use cases, organizations may employ communication platforms for various messaging services. In an illustrative example, a communication platform, such as a Software as a Service (SaaS) platform, may facilitate sending of messages, such as SMS messages, MMS messages, and/or IM messages, to recipient devices via various communication channels. "Communication channel" refers to a medium that uses one or more of a particular protocol, a particular underlying technology or is provided by a particular entity (e.g., third-party entity). Accordingly, a SAAS platform may utilize various communication channels relying upon one or more communication protocols through which messages may be forwarded to recipient devices. For example, the SaaS platform may use one or more hosted and/or ported telephone numbers to send text messages (e.g., SMS messages) to recipient devices using one or more SMS communication channels, such as telecommunications carrier networks. In another example, the SaaS platform may send instant messages to recipient devices using one or more IM communication channels. Examples of communication channels include mobile network-based channels such as SMS or MMS, Internet Protocol (IP)-based channels, voicemail, and proprietary channels (e.g., social media messaging applications).

In some implementations, multiple organizations, represented by their respective accounts, may use a single messaging platform for forwarding their messages. Since the messaging resources (e.g., the outgoing messaging bandwidth) of the messaging platform, which are shared by multiple accounts, would necessarily be limited by the communication channel capacity and/or other factors, a "noisy neighbor" effect may occur when an account uses the majority of available resources and thus causes other accounts to suffer performance issues.

Furthermore, in some implementations, an organization represented by a corresponding account may provide messaging services to its clients (referred to herein as "tenants"), each of which may, in turn, utilize the messaging services to communicate to its end users. This effectively results in a hierarchical arrangement, in which multiple tenants within an organization (also referred to herein as "tenant set"), as well as multiple organizations served by a messaging platform, would compete for the messaging resources, and such competition may potentially lead to multiple "noisy neighbor" effect at each of one or more hierarchical levels.

Aspects of the disclosure address the above-mentioned and other challenges by maintaining multiple messaging queues that facilitate a fair distribution of the available messaging resources (e.g., messaging bandwidth or messaging rate) associated with a given destination, for example, a destination network. In an illustrative example, a destination may be identified by the Mobile Country Code (MCC) and/or Mobile Network Code (MNC). In another illustrative example, a destination may be identified by a provider identifier, a geographical area identifier, one or more other identifiers, or their various combinations. In operation, a messaging platform may allocate, to each sub-account ("tenant"), a respective portion of the messaging resources that are available to the parent account ("tenant set") that owns the sub-account. "Fair" distribution herein refers to a distribution that guarantees equal or near equal messaging resource quotas (e.g., specified by the messaging bandwidth or messaging rate) afforded to all participants (e.g., tenants of a given tenant set).

Furthermore, in some implementations, a dedicated queue may be allocated to each sender (represented, e.g., by an origin endpoint identifier, such as a sender phone number used for outgoing SMS messages or a sender account identifier user for other communication channels) of a given tenant. In some implementations, the queues may be created and destroyed on-demand, such that a queue that has been created for servicing certain tenant, sender, and destination would be destroyed once all messages have been processed.

The queues may be dynamically re-scored based on the number of tenants and/or number of senders associated with the given tenant. In some implementations, the messaging resource quota (e.g., specified by the messaging bandwidth or messaging rate) of a given parent account ("tenant set") is fairly (e.g., equally) distributed between all of its sub-accounts that are actively sending messages.

Furthermore, in some implementations, the messaging resource quota (e.g., specified by the messaging bandwidth or messaging rate) allocated to a given sub-account at any given time is equally divided between all its senders that are actively sending messages.

"Equal distribution" or "equally distributed" herein mean that the difference between the rates allocated to any two equally positioned participants (e.g., tenants of a given account or senders of a given tenant) would differ by no more than a predefined value reflecting the permissible deviation from the "absolute" fairness (i.e., from the absolute equal allocation).

In some implementations, responsive to determining that a value of a chosen performance metric associated with a given queue satisfies a predefined condition, the processing logic may synchronously fail a subsequent messaging request initiated by the tenant that owns the given queue, as described in more detail herein below.

Accordingly, the present disclosure addresses the technical problem of providing a fair dynamic distribution of messaging resources between multiple users of a SaaS messaging platform (e.g., between multiple tenants, or sub-accounts, of a given account of the SaaS messaging platform).

A technical solution to the above-identified technical problem may involve fairly distributing the available messaging rate for a given destination (e.g., a destination network defined by the MCC and/or MNC) by allocating, to each sub-account ("tenant") of an account of a messaging platform, a respective portion of the messaging bandwidth that is available to the parent account of the sub-account.

Another technical solution to the above-identified technical problem may involve implementing multiple messaging queues, such that a dedicated queue is allocated to each sender of a given tenant. The queue may then be dynamically re-scored based on the number of tenants and number of senders associated with the given tenant.

Thus, the technical effect may include providing a fair multi-level distribution, by dynamically distributing of messaging resources associated with a given destination network between multiple sub-accounts ("tenants") and between senders within each tenant, as described in more detail herein below.

Various aspects of the methods and systems are described herein by way of examples, rather than by way of limitation. The systems and methods described herein may be implemented by hardware (e.g., general purpose and/or specialized processing devices, and/or other devices and associated circuitry), software (e.g., instructions executable by a processing device), or a combination thereof.

FIG. 1 illustrates an example system architecture 100, in accordance with some implementations of the disclosure. The system architecture 100 (also referred to as "system" herein) includes a communication services platform 120, a data store 106, client devices 110A-110Z connected to a network 104, client devices 112A-112Z communicatively coupled to communication services platform 120, and communication channels 114A-114Z coupled to the network 104 (or otherwise communicatively coupled to other elements of the system 100).

In implementations, network 104 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 106 is a persistent storage that is capable of storing data as well as data structures to tag, organize, and index the data. Data store 106 may be hosted by one or more storage devices, such as main memory, magnetic or optical storage based disks, tapes or hard drives, NAS, SAN, and so forth. In some implementations, data store 106 may be a network-attached file server, while in other implementations data store 106 may be some other type of persistent storage such as an object-oriented database, a relational database, and so forth, that may be hosted by communication services platform 120 or one or more different machines coupled to the communication services platform 120 via the network 104.

The client devices 110A-110Z (generally referred to as "client device(s) 110" herein) may each include a type of computing device such as a desktop personal computer (PCs), laptop computer, mobile phone, tablet computer, netbook computer, wearable device (e.g., smart watch, smart glasses, etc.) network-connected television, smart appliance (e.g., video doorbell), any type of mobile device, etc. In some implementations, client devices 110 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components. In some implementations, client devices 110A through 110Z may also be referred to as "user devices."

In some implementations, a client device, such as client device 110Z, may implement or include one or more applications, such as application 154 (also referred to as "client application 154" herein) executed at client device 110Z. In some implementations, application 154 may be used to communicate (e.g., send and receive information) with communication services platform 120. In some implementations, application 154 may implement user interfaces (e.g., graphical user interfaces (GUIs)) that may be webpages rendered by a web browser and displayed on the client device 110Z in a web browser window. In another implementation, the user interfaces of client application 154 may be included in a stand-alone application downloaded to the client device 110Z and natively running on the client device 110Z (also referred to as a "native application" or "native client application" herein).

In some implementations, client devices 110 may communicate with communication services platform 120 using one or more function calls, such as application programming interface (API) function calls (also referred to as "API calls" herein). For example, the one or more function calls may be identified in a request using one or more application layer protocols, such a HyperText Transfer Protocol (HTTP) (or HTTP secure (HTTPS)), and that are sent to the communication services platform 120 from the client device 110Z implementing application 154. In some implementations, the communication services platform 120 may respond to the requests from the client device 110Z by using one or more API responses using an application layer protocol. Similarly, communication services platform 120 may communicate with one or more communication channels 114A-114Z using API function calls.

In some implementations, one or more of client devices 110 may be identified by a uniform resource identifier (URI), such as a uniform resource locator (URL). For example, communication services platform 120 may send an API call to client device 110Z addressed to a URL specific to the client device 110Z. In some implementations, the communication services platform 120 may be identified by a URI. For instance, the API call sent by a client device 110 to communication services platform 120 may be directed to the URL of communication services platform 120.

In some implementations, client devices 112A-112Z (generally referred to as "client device(s) 112" herein) may be similar to client devices 110. In some implementations, client devices 112 may include one or more telephony devices. A telephony device may include a Public Switched Telephone Network (PSTN)—connected device, such as a landline phone, cellular phone, or satellite phone, for example. In some implementations, a telephony device may also include an internet addressable voice device (e.g., non-PSTN telephony device), such as Voice-Over-Internet-Protocol (VOIP) phones, or Session Initiation Protocol (SIP) devices, for example. In some implementations, a telephony device may include one or more messaging devices, such as a Short Message Service (SMS) network device that, for example, uses a cellular service to exchange SMS messages or Multimedia Messaging Service (MMS) messages.

In some implementations, the communication services platform 120 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components that may be used to provide a user with access to data or services. Such computing devices may be positioned in a single location or may be distributed among many different geographical locations. For example, communication services platform 120 may include a plurality of computing devices that together may comprise a hosted computing resource, a grid computing resource or any other distributed computing arrangement. In some implementations, communication services platform 120 may correspond to an elastic computing resource where the allotted capacity of processing, network, storage, or other computing-related resources may vary over time.

In some implementations, communication services platform 120 provides one or more API endpoints 166 that may expose services, functionality or content of the communication services platform 120 to one or more of client devices 110 or communication channels 114A-114Z. In some implementations, an API endpoint may be one end of a communication channel, where the other end may be another system, such as a client device 110Z or communication channel 114Z. In some implementations, the API endpoint may include or be accessed using a resource locator, such a universal resource locator (URL), of a server or service. The API endpoint may receive requests from other systems, and in some cases, return a response with information responsive to the request. In some implementations, HTTP or HTTPS methods may be used to communicate to and from API endpoint 166.

In some implementations, the API endpoint 166 (also referred to as a "messaging request interface" herein) may function as a computer interface through which communication requests, such as message requests, are received and/or created. The communication services platform 120 may include one or more types of API endpoints.

In some implementations, the API endpoint 166 may include a messaging API whereby external entities or systems may send a communication to create message content and/or request sending of a message. The API may be used in programmatically creating message content and/or requesting sending of one or more messages. In some implementations, the API is implemented in connection with a multitenant communication service wherein different accounts (e.g., authenticated entities) may submit independent requests. These requests made through the API may be managed with consideration of other requests made within an account and/or across multiple accounts on the communication service.

In some implementations, the API of the API endpoint 166 may be used in initiating general messaging or communication requests. For example, a messaging request may indicate one or more destinations (e.g., specified by endpoint identifiers such as recipient phone numbers), message content (e.g., text and/or media content), and possibly an origin endpoint identifier (e.g., a sender phone number to be associated with outgoing SMS messages).

In some implementations, the API of the API endpoint 166 may be any suitable type of API such as a REST (Representational State Transfer) API, a GraphQL API, a SOAP (Simple Object Access Protocol) API, and/or any suitable type of API. In some implementations, the communication services platform 120 may expose through the API, a set of API resources which when addressed may be used for requesting different actions, inspecting state or data, and/or otherwise interacting with the communication platform.

In some implementations, a REST API and/or another type of API may work according to an application layer request and response model. An application layer request and response model may use HTTP (Hypertext Transfer Protocol), HTTPS (Hypertext Transfer Protocol Secure), SPDY, or any suitable application layer protocol. Herein HTTP-based protocol is described for purposes of illustration rather than limitation. The disclosure should not be interpreted as being limited to the HTTP protocol. HTTP requests (or any suitable request communication) to the communication services platform 120 may observe the principles of a RESTful design or the protocol of the type of API. RESTful is understood in this document to describe a Representational State Transfer architecture. The RESTful HTTP requests may be stateless, thus each message communicated contains all necessary information for processing the request and generating a response. The API service may include various resources, which act as endpoints that may specify requested information or requesting particular actions. The resources may be expressed as URI's or resource paths. The RESTful API resources may additionally be responsive to different types of HTTP methods such as GET, PUT, POST and/or DELETE.

In some implementations, the API endpoint 166 may include a message request instruction module that may be called within an application, script, or other computer instruction execution. For example, a computing platform may support the execution of a set of program instructions where at least one instruction within a script or other application logic is used in specifying a message request and communicating that request.

In some implementations, the API endpoint 166 may include a console, administrator interface, or other suitable type of user interface. Such a user-facing interface may be a graphical user interface. Such a user interface may additionally work in connection with a programmatic interface.

In some implementations, the message request may include a data object characterizing the properties of a message. In some implementations, the communication services platform 120 is associated with message requests that are programmatically initiated (e.g., an application-to-person (A2P) message). In some implementations, the message request could be one initiated from an inbound received message.

In some implementations, the message request may include one or more of one or more destinations, one or more origin endpoints, and message content. In some implementations, one or more of these properties may be specified indirectly such as through system or account configuration. For example, all messages may be automatically assigned an origin endpoint that is associated with an account. In some implementations, the message content may include any suitable type of media content including, text, audio, image data, video data, multimedia, interactive media, data, and/or any suitable type of message content.

In an illustrative example, used for illustration rather than limitation, communication services platform 120 may include a Software as a Service (SaaS) platform that may at least in part provide one or more services, such as communication services, to one or more clients. The SaaS platform may deploy services, such as software applications, to one or more clients for use as an on-demand service. For example, the SaaS platform may deliver and/or license software applications on a subscription basis while also hosting, at least in part, the software application. The licensed software applications can, at least in part, be hosted on the infrastructure, such as the cloud computing resources of the SaaS platform.

In some implementations, communication services platform 120, as noted above, may provide communication services that include, but are not limited to, voice services, messaging services (e.g., SMS services or MMS services), email services, video services, chat messaging services (e.g., internet-based chat messaging services), or a combination thereof. Communication operations using the communication services may use one or more of a communication network (e.g., Internet), telecommunications network (e.g., such as a cellular network, satellite communication network, or landline communication network), or a combination thereof, to transfer communication data between parties.

In some implementations, the messaging system 122 may function to interface with one or more communication network(s) and/or service(s) for facilitating SMS, MMS, and/or chat messaging). In some implementations, the messaging system 122 may include an interface to one or more carrier-based communication routes used in sending SMS, MIMS, and/or other carrier-based messages. There may be multiple carrier-based communication routes that serve as different optional "routes" when sending communications over a carrier-based network (e.g., a mobile network). The messaging system 122 may additionally or alternatively include an interface to one or more over-the-top (OTT) communication channels which may be offered by a third-party messaging platform (e.g., proprietary social media messaging, messaging applications, etc.).

A route may refer to a communication delivery path, defined by a series of one or more of computers, routers, gateways and/or carrier networks through which the communication is transferred from a source computer to a destination computer (e.g., through which the transmission of a message occurs). For example, the same route may be used to transfer messages using different communication channels, and the same communication channel may be used to transfer messages using different routes. In some example implementations, different channels correspond to different applications on a receiving device. For example, a smart phone may have one application to handle SMS messages, another application to handle email, and a third application to handle voicemail. Alternatively, some applications may handle multiple communication channels. For example, one application may handle both SMS and MMS messages.

In some implementations, when the messaging system 122 elects to send a message using a carrier-based channel, the message is communicated to an appropriate carrier connection for routing to the destination (e.g., a destination network or endpoint). Carrier-based channels may use SMPP (Short Message Peer-to-Peer protocol) for communicating to an aggregator or another suitable gateway such that the SMS/MMS message is transferred over a carrier network. Once transmitted to the carrier network, the message may be relayed appropriately to arrive at the intended destination. A message in transit may have multiple routing segments that are used in the delivery to an end destination device.

For example, the messaging system 122 may include an interface to one or more SMS Gateways that enable a computer to send and receive SMS text messages to and from a SMS capable device over the global telecommunications network (normally to a mobile phone). The SMS Gateway translates the message sent and makes it compatible for delivery over the network to be able to reach the recipient. The different SMS gateways (or more generally message gateways) may serve as different route options when the messaging system 122 is determining a channel and/or route to be used for one or more message transmissions.

In some implementations, SMS Gateways may route SMS text messages to the telco networks via an SMPP interface that networks expose, either directly or via an aggregator that sells messages to multiple networks. SMPP, or Short Message Peer-to-Peer, is a protocol for exchanging SMS messages between Short Message Service Centers (SMSCs) and/or External Short Messaging Entities (ESMEs).

In some implementations, the destination of a message may be used in determining the candidate message routes (and/or channels). For example, a phone number of a destination endpoint or another identifier associated with the intended recipient of the message may be used to identify the destination network associated with the intended recipient. For example, a destination network may be identified by an MCC/MNC pair.

In some implementations, communication services platform 120 includes a messaging system 122 that may use the phone number associated with the intended recipient of the message to lookup the MCC/MCN pair identifying the destination network. For example, the messaging system 122 may determine the MCC/MNC pair using an MCC/

MNC directory that lists the MCC/MNC pair corresponding to each phone number. In some implementations, the MCC/MNC directory may be stored in a routing provider storage. Alternatively, the MCC/MNC directory may be stored at some other network accessible location. In either case, the messaging system 122 may use the phone number associated with the intended recipient of the message to query the MCC/MNC directory and identify the MCC/MNC pair that identify the corresponding destination network.

In some implementations, the messaging system 122 may use the MCC/MNC pair retrieved from the MCC/MNC directory to identify candidate routing providers and routes that are available to deliver a message to the destination network identified by MCC/MNC pair. For example, the routing provider storage may include a routing provider directory that lists each MCC/MNC pair serviced by the messaging system 122 and the corresponding routing providers and routes available for use with each MCC/MNC pair. That is, the routing provider directory may list the routing providers and routes that are available to the messaging system 122 to deliver messages to the destination network identified by each MCC/MNC pair listed in the routing provider directory.

In some implementations, communication services platform 120 may support multiple tenants, each tenant being, e.g., an organization represented by a corresponding account registered with the communication services platform 120. "Organization" herein refers to any entity that may include one or more hierarchical levels, such that one or more organizational units may be associated with each of the hierarchical levels. One or more end users (e.g., members or employees) may be associated with each organizational unit. For example, an organization may be a legal entity (e.g., a corporation). "User" herein may refer to an individual, an entity controlled by multiple individuals, and/or an automated software and/or hardware module.

In general, functions described as being performed by the communication services platform 120 may also be performed on the client devices 110A through 110Z (and vice versa), if appropriate. In addition, the functionality attributed to a particular component may be performed by different or multiple components operating together. The communication services platform 120 may also be accessed as a service provided to other systems or devices through appropriate APIs.

The multitenancy mode of operation of the communication services platform 120 may involve multiple instances of one or multiple software applications operating in a shared computing environment. Thus, the application instances (i.e., employed by respective tenants) may be logically isolated while sharing common hardware and/or messaging resources.

As noted herein above, a communication channel may be provided by a particular entity (e.g., third-party entity) that offers services, software or hardware (or a combination thereof) through which messages may be sent to recipient devices. (e.g., organizations different from communication services platform 120). In some implementations, the communication services offered by communication channels 114A-114Z may be integrated into communication services platform 120. In some implementations, the communication services offered by communication channels 114A-114Z may include messaging services. In some implementations, messaging services may include one or more of a short messaging service (SMS) offered by an SMS channel, a multimedia messaging service (MMS) offered by an MMS channel, or an instant messaging service (e.g., chat messaging) offered by an instant messaging service channel. In some implementations, the communication channels 114A-114Z may include one or more electronic mail channels.

In some implementations, a standard protocol may be employed by a communication channel for sending and receiving email messages. The standard protocol may be used across different platforms. In some implementations, instant messages may use protocols specific to a platform that may or may not be compatible with other platforms.

Although implementations of the disclosure are discussed in terms of SaaS communication service platforms, implementations may also be generally applied to other types of platform, system or service.

In situations in which the systems discussed here collect personal information about users, or may make use of personal information, the users may be provided with an opportunity to control whether the communication services platform 120 collects user information, or to control whether and/or how to receive content from the communication services platform 120 that may be more relevant to the user. In addition, certain data may be treated in one or more ways before it is stored or used, so that personally identifiable information is removed. For example, a user's identity may be treated so that no personally identifiable information may be determined for the user, or a user's geographic location may be generalized where location information is obtained (such as to a city, ZIP code, or state level), so that a particular location of a user cannot be determined. Thus, the user may have control over how information is collected about the user and used by the communication services platform 120.

Elements of FIG. 1 are used with respect to FIGS. 2-5 to help describe various aspects and features of the communication services platform 120. As noted herein above, the communication services platform 120 may provide a fair distribution of the available messaging resources (e.g., messaging bandwidth) associated with a given destination (e.g., a destination network defined by the MCC and MNC). In some implementations, the distribution of the available messaging resources is implemented by a message queuing module 151.

In some implementations, the fair distribution of the messaging resources may involve maintaining multiple messaging queues, which would facilitate allocating, to each sub-account ("tenant") of an account ("tenant set") of a messaging platform, a portion of the messaging resources that are available to the parent account of the sub-account. In some implementations, the fair distribution affords equal or near equal messaging resource quotas to all participants (e.g., tenants of a given account). Furthermore, a dedicated queue may be allocated to each sender (e.g., a phone number used for outgoing SMS messages) of a given tenant.

Figure 2:
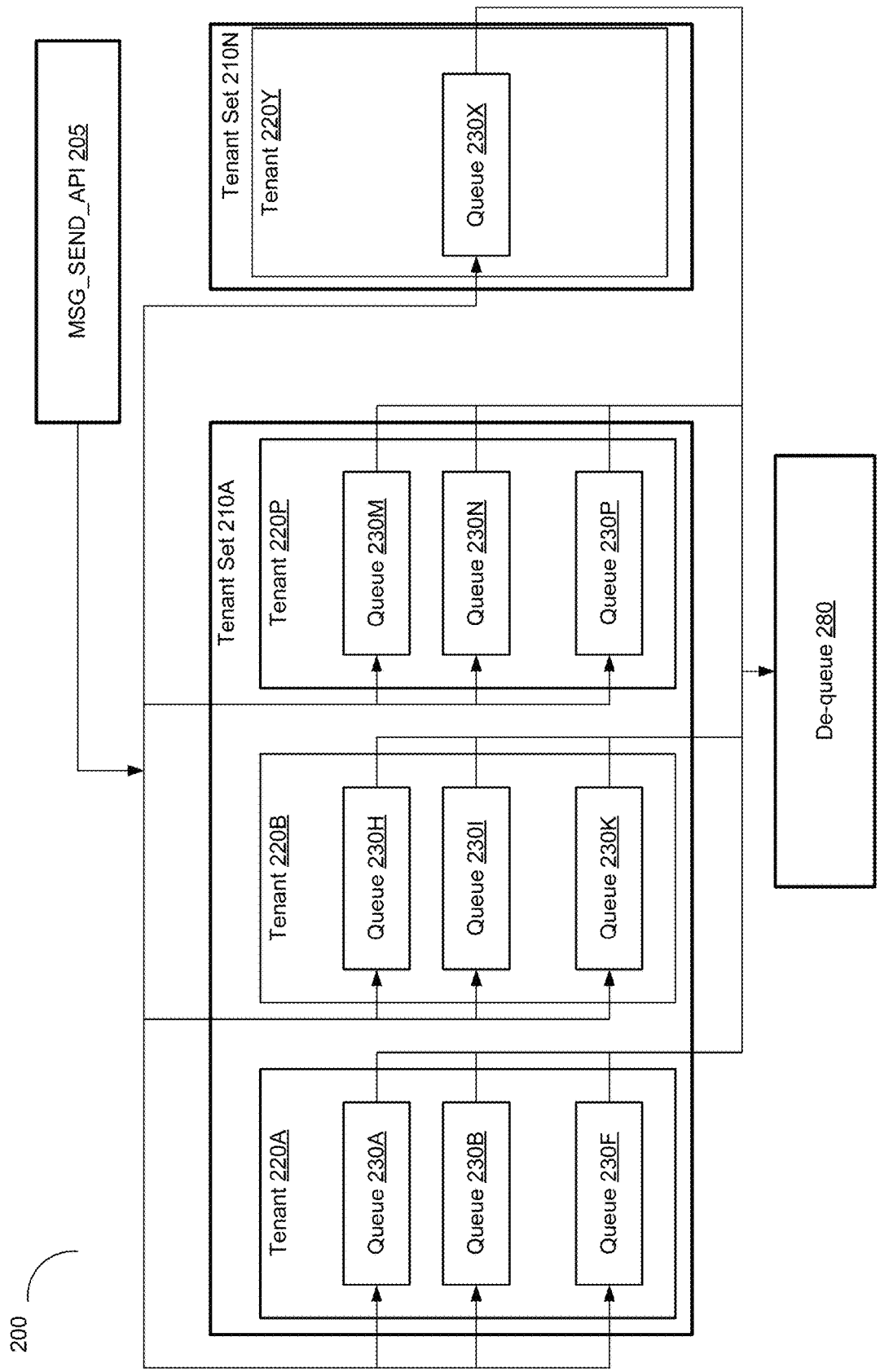
FIG. 2 schematically illustrates an example messaging queue structure maintained by communication services platform operating in accordance with aspects of the present disclosure for a given destination.

FIG. 2 schematically illustrates an example messaging queue structure maintained by communication services platform operating in accordance with aspects of the present disclosure for a given destination. In some implementations, the destination may be represented by a network, which may be identified by the MCC and/or MNC. As shown in FIG. 2, the communication services platform 120 may serve multiple accounts ("tenant sets") 210A-210N. Each tenant set 220 may include multiple tenants 230 (e.g., tenants 220A-220P may be associated with the tenant set 210A). As each tenant may have one or more senders (represented, e.g., by an origin endpoint identifier, such as a sender phone number used for outgoing SMS messages or a sender account identifier user for other communication channels) associated with it, the communication services platform 120 may support a dedicated messaging queue for each sender associated with a given tenant. For example, for tenant 220A, the communication services platform 120 may maintain messaging queues 230A-230K, such that each messaging queue 230 is exclusively associated with a respective sender.

In some implementations, the queues may be horizontally partitioned ("sharded") between two or more physical or virtual nodes of a cluster, in order to balance the workload across multiple nodes. Accordingly, each queue 230 may be distributed ("striped") across multiple partitions ("shards") residing on respective nodes. Thus, each node may implement the messaging queue structure (e.g., the messaging queue structure 200) for each destination. Such horizontal sharding of the queues would allow linear scaling by adding nodes as the workload increases.

The communication services platform 120 may expose the MSG_SEND_API endpoint 205 for receiving, from clients of the communication services platform 120, messages to be forwarded to their respective recipients. Responsive to receiving, via the MSG_SEND_API endpoint 205, a request to forward a message, the communication services platform 120 may utilize the request parameters to identify a queue 230 for enqueueing the message. In an illustrative example, the queue may be identified by the combination of destination network identifier (e.g., MCC and MNC), the parent account identifier, the tenant identifier, and the sender identifier. In clustered implementations, the queue 230 may be chosen on any available shard (e.g., following a round robin pattern, randomly selecting a shard, selecting a shard exhibiting the least value of a chosen computing resource usage metric over a moving time window, or applying any other suitable load balancing technique).

The communication services platform 120 may dynamically score (e.g., prioritize) the queues in order to provide a fair distribution that would afford equal communication resource quotas (e.g., messaging rates) to all participants (e.g., tenants of a given account). Furthermore, the communication services platform 120 may provide an equal or near equal distribution of the outgoing messages between all senders associated with a given tenant (in order to, e.g., equally distribute the load created by response (mobile-originated) messages).

De-queue module 280 may retrieve the messages from queues 230 in the order of their scores (priorities) and forwards the messages to their respective recipients via one or more communication gateways. In an illustrative example, the de-queue module 280 may retrieve one message from each serviceable queues in the order of the respective queue scores (priorities). In clustered implementations having each queue is striped across multiple shards, the de-queue module 280 may ignore the distributed nature of the queues and process all shards of each queue as if the queue resided on a single node. Alternatively, multiple de-queue modules 280 may be employed, such as each de-queue module 280 would process a certain subset of shards.

Upon de-queueing, the queues 230 may be dynamically re-scored in order to fairly distribute the messaging resource quota (e.g., the messaging bandwidth or the messaging rate) that is allocated to the parent account between all tenants of the parent account, and further to equally distribute the messaging rate between all senders associated with each tenant. In some implementations, dynamically re-scoring the queues may involve assigning, to each queue, a score that is proportional to or otherwise reflects its share of the messaging resource quota (e.g., the messaging rate). Assuming that the de-queueing module 280 retrieves the messages from the queues in the order of their scores (priorities), the higher scored queues would be serviced more often, thus resulting in the higher messaging rate being afforded to the higher scored queues.

Figure 3:
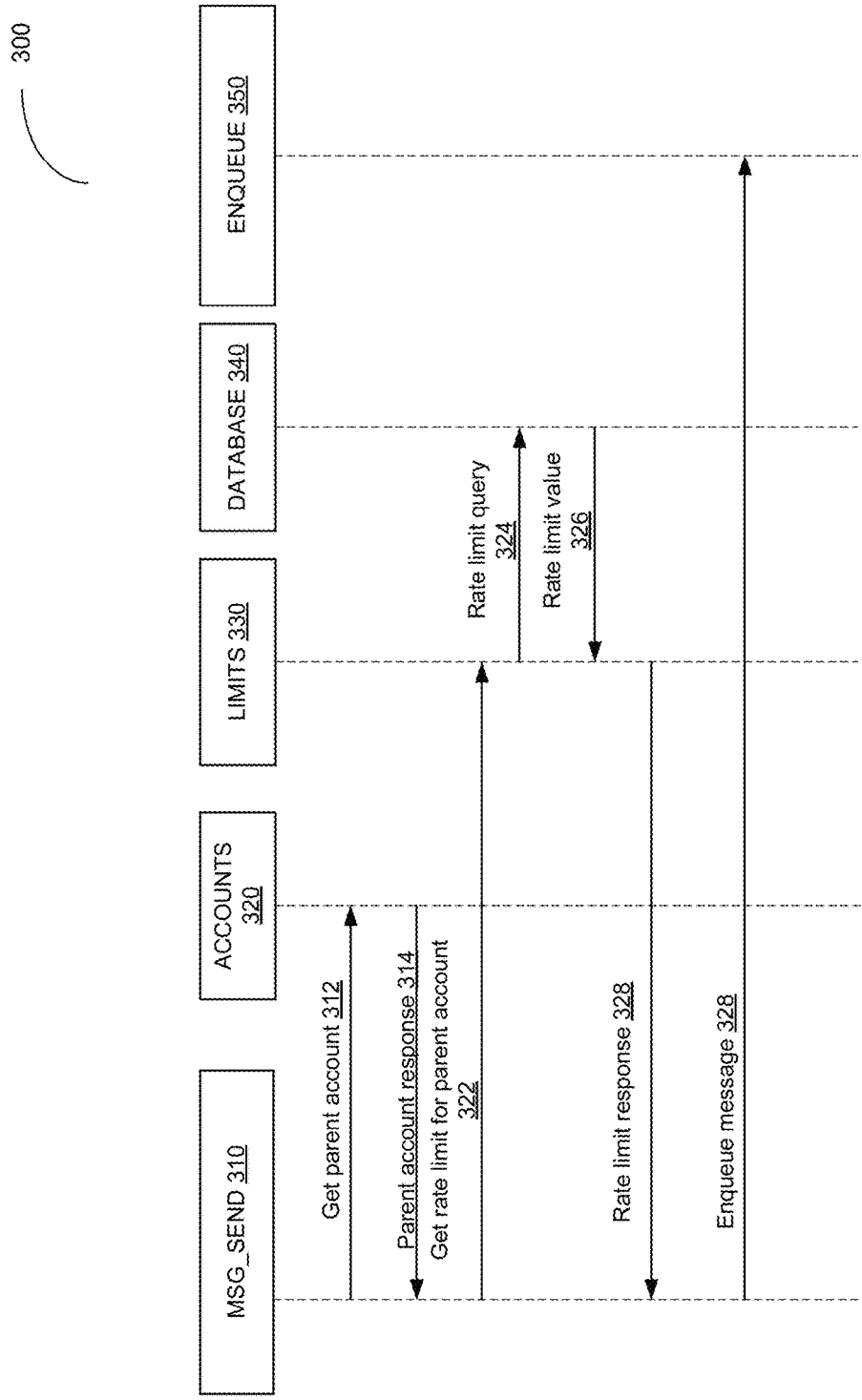
FIG. 3 illustrates an interaction diagram of several components of a communication services platform operating in accordance with aspects of the present disclosure.

FIG. 3 illustrates an interaction diagram of several modules of a communication services platform operating in accordance with aspects of the present disclosure. Diagram 300 illustrates the send message (MSG_SEND) module 310, account information (ACCOUNTS) module 320, communication resource limit information (LIMITS) module 330, database 340, and message enqueue (ENQUEUE) module 350. In some implementations, each of the above-referenced modules is implemented by one or more software and/or hardware components. In some implementations, each of the above-referenced modules exhibit respective API endpoints for consumption by clients and/or other modules of the communication services platform 120.

In an illustrative example, upon receiving a request to send an outgoing message (not shown in FIG. 3 for clarity and conciseness), the processing logic implementing the send message (MSG_SEND) module 310 queries (operation 312) the account information module (ACCOUNTS) 320, which returns (operation 314) the identifier of the parent account associated with the sub-account (tenant) that has originated the messaging request.

The processing logic then queries (operation 322) the communication resource limit information (LIMITS) module 330 for the messaging resource quota (e.g., the messaging rate limit) allocated to the parent account for the specified destination (e.g., destination network identified by the MCC and/or MNC). In turn, the processing logic implementing the communication resource limit information (LIMITS) module 330 queries (operation 324) the database 340, which returns (operation 326) the requested messaging resource quota allocated to the parent account for the specified destination. Then, the messaging resource quota is forwarded (operation 328) to the processing logic implementing the send message (MSG_SEND) module 310.

In some implementations, the communication resource limit information (LIMITS) module 330 further retrieves, from the database 340, and returns to the processing logic implementing the send message (MSG_SEND) module 310 the threshold value of a chosen performance metric associated with the parent account. In an illustrative example, the threshold value of the performance metric may reflect (i.e., be represented by a mathematical function of) the total size or the number of the messages that are currently present in the chosen queue. In another illustrative example, the threshold value of the performance metric may reflect (i.e., be represented by a mathematical function of) the maximum period of time that a newly enqueued message is allowed to stay in the queue.

Then, the processing logic implementing the send message (MSG_SEND) module 310 identifies a queue 230 for enqueueing the message. In an illustrative example, the queue may be identified by the combination of the destination identifier (e.g., MCC and MNC), the parent account identifier, the tenant identifier, and the sender identifier. The processing logic enqueues the message into the identified queue, based on the messaging resource quota (e.g., messaging rate) associated with the parent account and the threshold value of the performance metric.

In some implementations, responsive to determining that a value of a chosen performance metric associated with a given queue exceeds the corresponding threshold value, the processing logic may fail a subsequent message request initiated by the tenant that owns the given queue.

The queues may be dynamically re-scored (e.g., re-prioritized) to ensure the fair distribution of the available messaging resources (e.g., messaging bandwidth). In an illustrative example, once all queues of a given tenant become empty, the available messaging resource quota (e.g., messaging rate) is re-distributed between all remaining tenants of the parent account. In another illustrative example, a new tenant may become associated with the parent account, which would result in creating new queue(s) for one or more senders associated with the tenant, and re-distributing the available messaging resource quota (e.g., messaging rate) between all tenants of the parent account. In yet another illustrative example, a tenant may leave the parent account, which would result in destroying the queue(s) of one or more senders associated with the tenant, and re-distributing the available messaging resource quota (e.g., messaging rate) between the remaining tenants of the parent account. In yet another illustrative example, a new sender may become associated with a tenant, which would result in creating a new queue associated with the sender, and re-distributing the available messaging resource quota (e.g., messaging rate) between the all senders of the tenant. In yet another illustrative example, a sender may be disassociated from a tenant, which would result in destroying a queue associated with the sender, and re-distributing the available messaging resource quota (e.g., messaging rate) between the remaining senders of the tenant.

De-queue operation 280 retrieves the messages from queues 230 in the order of their scores (priorities) and forwards the messages to their respective recipients via one or more communication gateways.

In some implementations, the notions of tenant set, tenant, and sender can be replaced with other notions describing other multi-level hierarchical structures (e.g., organizations—organizational units—users). Accordingly, in some implementations, the messaging resource quotas may be effectively determined by the parameters of the hierarchical structures (e.g., by the respective cardinalities of the tenant sets and sender sets) irrespectively of the functional designation of the entities organized in such hierarchical structures.

Figure 4:
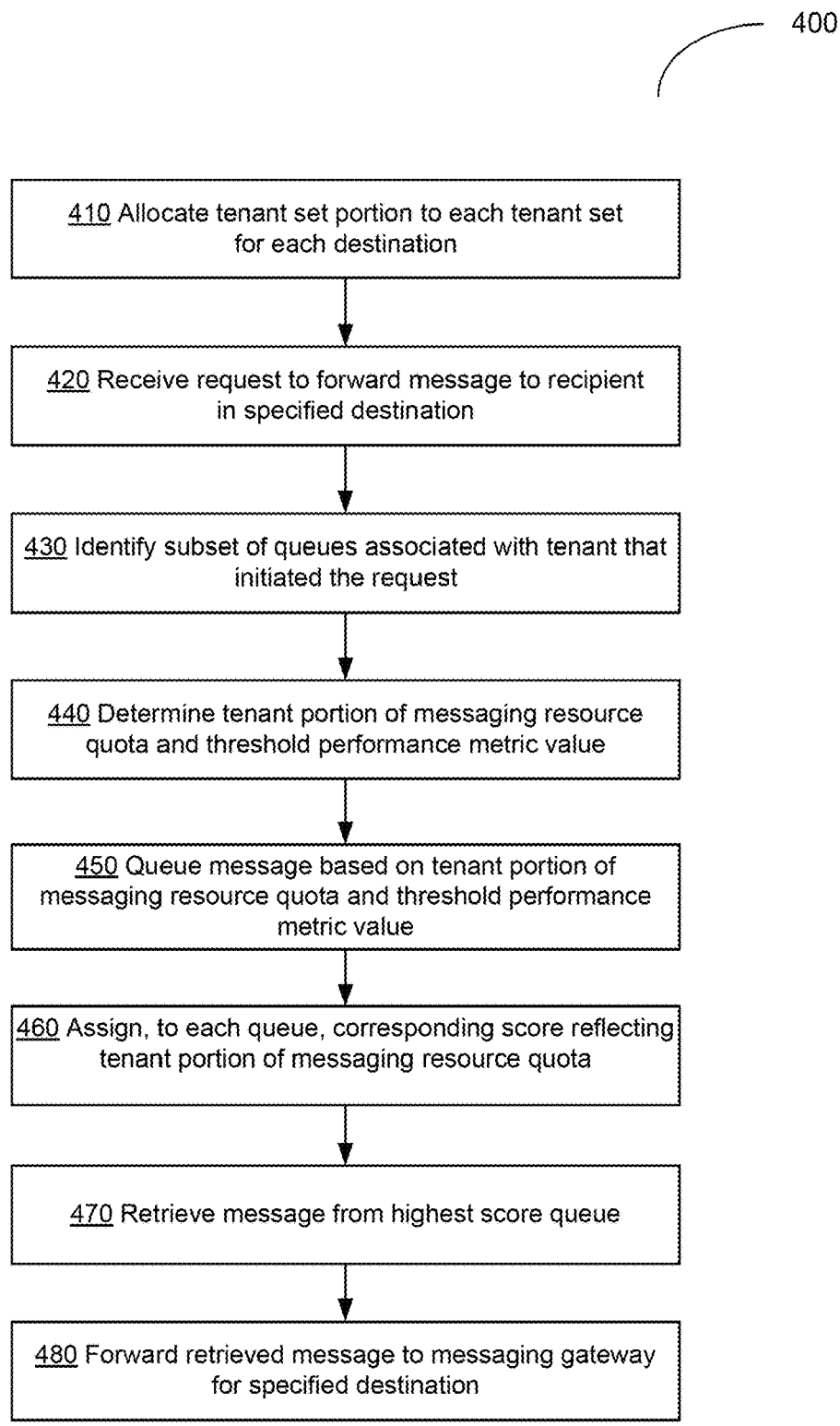
FIG. 4 is a flow diagram of an example method of dynamically distributing messaging resources in a software as a service (SaaS) platform, in accordance with aspects of the present disclosure.

FIG. 4 is a flow diagram of an example method of dynamically distributing messaging resources in a software as a service (SaaS) platform, in accordance with aspects of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some implementations, the method 400 is performed by the one or more modules (e.g., message queueing module 151) of the communication services platform 120 of FIG. 1. Although shown in a particular sequence or order, unless otherwise specified, the order of the operations can be modified. Thus, the illustrated implementations should be understood only as examples, and the illustrated operations can be performed in a different order, while some operations can be performed in parallel. Additionally, one or more operations can be omitted in some implementations. Thus, not all illustrated operations are required in every implementation, and other process flows are possible.

At operation 410, the processing logic implementing the method allocates, for each destination (e.g., for each destination network or destination endpoint), to each tenant set of a plurality of tenant sets, a respective tenant set portion of a messaging resource quota associated with the destination, as described in more detail herein above.

At operation 420, the processing logic receives, from a tenant, a request to forward a message to a recipient associated with a specified destination (e.g., recipient residing within a specified destination network or a recipient connected to/represented by the specified destination endpoint), as described in more detail herein above.

At operation 430, the processing logic identifies a subset of queues associated with the tenant that has initiated the request, as described in more detail herein above.

At operation 440, the processing logic determines the tenant portion of the messaging resource quota of the tenant set and the threshold performance metric value for the tenant set, as described in more detail herein above.

At operation 450, the processing logic queues the message into a chosen queue of the subset of queues associated with the tenant, based on the tenant portion of the messaging resource quota of the tenant set and the threshold performance metric value for the tenant set, as described in more detail herein above.

At operation 460, the processing logic assigns, to each queue of a plurality of queues associated with the plurality of tenant sets, a corresponding score reflecting a respective tenant portion of a messaging resource quota associated with the specified destination (e.g., the specified destination network or destination endpoint), as described in more detail herein above.

At operation 470, the processing logic retrieves a message from a queue associated with a highest score, as described in more detail herein above.

At operation 480, the processing logic forwards the retrieved message to a messaging gateway associated with the specified destination (e.g., the specified destination network or destination endpoint), as described in more detail herein above, and the method terminates.

Figure 5:
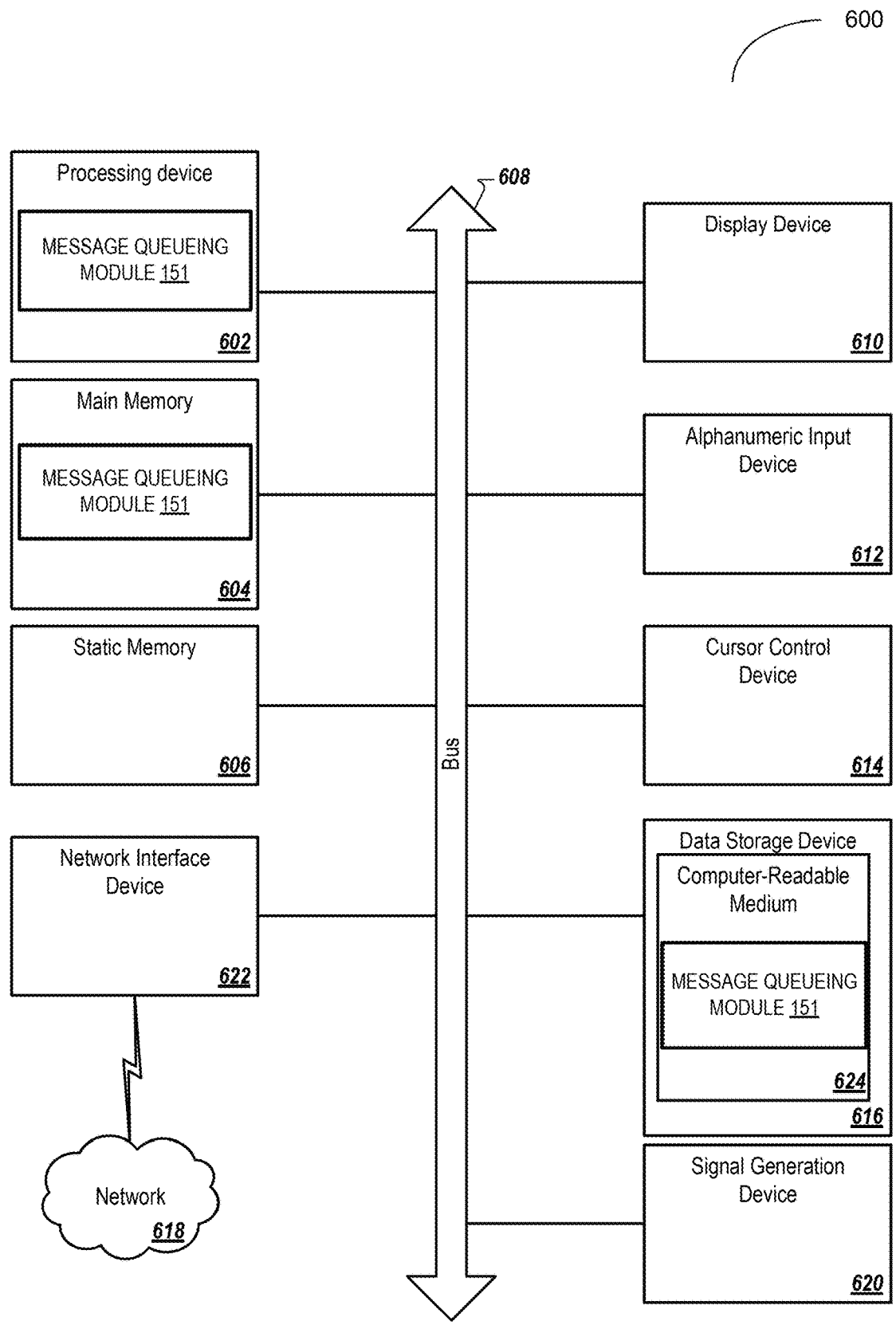
FIG. 5 is a block diagram illustrating an exemplary computer system, in accordance with some implementations of the disclosure.

FIG. 5 is a block diagram illustrating an exemplary computer system 600, in accordance with an implementation of the disclosure. The computer system 600 executes one or more sets of instructions that cause the machine to perform any one or more of the methodologies discussed herein. Set of instructions, instructions, and the like may refer to instructions that, when executed by computer system 600, cause computer system 600 to perform one or more operations of message queueing module 151. The machine may operate in the capacity of a server or a client device in a client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 616, which communicate with each other via a bus 608.

The processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute instructions of the system architecture 100 and message queueing module 151 for performing the operations discussed herein.

The computer system 600 may further include a network interface device 622 that provides communication with other machines over a network 618, such as a local area network (LAN), an intranet, an extranet, or the Internet. The computer system 600 also may include a display device 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a non-transitory computer-readable storage medium 624 on which is stored the sets of instructions of the system architecture 100 and message queueing module 151 embodying any one or more of the methodologies or functions described herein. The sets of instructions of the system architecture 100 and message queueing module 151 may also reside, completely or at least partially, within the main memory 604 and/or within the processing device 602 during execution thereof by the computer system 600, the main memory 604 and the processing device 602 also constituting computer-readable storage media. The sets of instructions may further be transmitted or received over the network 618 via the network interface device 622.

While the example of the computer-readable storage medium 624 is shown as a single medium, the term "computer-readable storage medium" may include a single medium or multiple media (e.g., a centralized or distributed database, and/or associated caches and servers) that store the sets of instructions. The term "computer-readable storage medium" may include any medium that is capable of storing, encoding or carrying a set of instructions for execution by the machine and that causes the machine to perform any one or more of the methodologies of the disclosure. The term "computer-readable storage medium" may include, but not be limited to, solid-state memories, optical media, and magnetic media.

In the foregoing description, numerous details are set forth. It will be apparent, however, to one of ordinary skill in the art having the benefit of this disclosure, that the disclosure may be practiced without these specific details. In some instances, well-known structures and devices are shown in block diagram form, rather than in detail, in order to avoid obscuring the disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "authenticating", "providing", "receiving", "identifying", "determining", "sending", "enabling" or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. The terms "first," "second," "third," "fourth," etc. as used herein are meant as labels to distinguish among different elements and may not necessarily have an ordinal meaning according to their numerical designation.

For simplicity of explanation, methods herein are depicted and described as a series of acts or operations. However, acts in accordance with this disclosure may occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

In additional implementations, one or more processing devices for performing the operations of the above described implementations are disclosed. Additionally, in implementations of the disclosure, a non-transitory computer-readable storage medium stores instructions for performing the operations of the described implementations. Also in other implementations, systems for performing the operations of the described implementations are also disclosed.

It is to be understood that the above description is intended to be illustrative, and not restrictive. Other implementations will be apparent to those of skill in the art upon reading and understanding the above description. The scope of the disclosure may, therefore, be determined with reference to the appended claims, along with the full scope of equivalents to which such claims are entitled.

What is claimed is:

1. A method, comprising:
    allocating, by a processing device, to each organization of a plurality of organizations, a respective portion of a messaging resource quota, wherein a first portion of the messaging resource quota is allocated to a first organization of the plurality of organizations;
    receiving, from a first client associated with the first organization, a request to forward a first message to a specified destination;
    identifying, among a plurality of queues associated with the plurality of organizations, a subset of queues associated with the first client;
    queuing the first message into a first queue of the subset of queues associated with the first client;
    assigning, to each queue of the plurality of queues, a score reflecting a respective client portion of the first portion of the messaging resource quota;
    retrieving a plurality of messages from the plurality of queues in order of respective scores associated with each queue of the plurality of queues; and
    forwarding the plurality of messages to their respective destinations.

2. The method of claim 1, wherein the messaging resource quota is represented by a messaging rate.

3. The method of claim 1, wherein each queue of the subset of queues is associated with a respective sender of the first client.

4. The method of claim 1, wherein the score assigned to each queue is further based on a number of senders of a respective client.

5. The method of claim 1, further comprising:
    dynamically re-scoring the plurality of queues upon retrieving a pre-defined number of messages from the plurality of queues.

6. The method of claim 1, further comprising:
    dynamically re-scoring the plurality of queues responsive to detecting a new client joining the first organization.

7. The method of claim 1, further comprising:
    responsive to determining that a value of a performance metric associated with the first queue exceeds a pre-defined threshold value, failing a subsequent message request initiated by the first client.

8. A system, comprising:
    a memory; and
    a processing device, coupled to the memory, the processing device configured to:
        allocate, to each organization of a plurality of organizations, a respective portion of a messaging resource quota, wherein a first portion of the messaging resource quota is allocated to a first organization of the plurality of organizations;
        receive, from a first client associated with the first organization, a request to forward a first message to a specified destination;
        identify, among a plurality of queues associated with the plurality of organizations, a subset of queues associated with the first client;
        queue the first message into a first queue of the subset of queues associated with the first client;
        assign, to each queue of the plurality of queues, a score reflecting a respective client portion of the first portion of the messaging resource quota;
        retrieve a plurality of messages from the plurality of queues in order of respective scores associated with each queue of the plurality of queues; and
        forward the plurality of messages to their respective destinations.

9. The system of claim 8, wherein the messaging resource quota is represented by a messaging rate.

10. The system of claim 8, wherein each queue of the subset of queues is associated with a respective sender of the first client.

11. The system of claim 8, wherein the score assigned to each queue is further based on a number of senders of a respective client.

12. The system of claim 8, wherein the processing device is further configured to:
    dynamically re-score the plurality of queues upon retrieving a pre-defined number of messages from the plurality of queues.

13. The system of claim 8, wherein the processing device is further configured to:
    dynamically re-score the plurality of queues responsive to detecting a new client joining the first organization.

14. The system of claim 8, wherein the processing device is further configured to:
    responsive to determining that a value of a performance metric associated with the first queue exceeds a pre-defined threshold value, fail a subsequent message request initiated by the first client.

15. A non-transitory computer-readable storage medium comprising executable instructions that, responsive to execution by a processing device, cause the processing device to:
    allocate, to each organization of a plurality of organizations, a respective portion of a messaging resource quota, wherein a first portion of the messaging resource quota is allocated to a first organization of the plurality of organizations;
    receive, from a first client associated with the first organization, a request to forward a first message to a specified destination;
    identify, among a plurality of queues associated with the plurality of organizations, a subset of queues associated with the first client;

queue the first message into a first queue of the subset of queues associated with the first client;

assign, to each queue of the plurality of queues, a score reflecting a respective client portion of the first portion of the messaging resource quota;

retrieve a plurality of messages from the plurality of queues in order of respective scores associated with each queue of the plurality of queues; and forward the plurality of messages to their respective destinations.

16. The non-transitory computer-readable storage medium of claim 15, wherein the messaging resource quota is represented by a messaging rate.

17. The non-transitory computer-readable storage medium of claim 15, wherein each queue of the subset of queues is associated with a respective sender of the first client.

18. The non-transitory computer-readable storage medium of claim 15, wherein the score assigned to each queue is further based on a number of senders of a respective client.

19. The non-transitory computer-readable storage medium of claim 15, further comprising executable instructions that, responsive to execution by the processing device, cause the processing device to:

dynamically re-score the plurality of queues upon retrieving a pre-defined number of messages from the plurality of queues.

20. The non-transitory computer-readable storage medium of claim 15, further comprising executable instructions that, responsive to execution by the processing device, cause the processing device to:

dynamically re-score the plurality of queues responsive to detecting a new client joining the first organization.

* * * * *